(12) United States Patent (10) Patent No.: US 7,409,250 B2
Arthursson et al. (45) Date of Patent: Aug. 5, 2008

(54) METHOD AND APPARATUS FOR THE DEVELOPMENT OF A CONTROL PROCESS FOR AN INSTRUMENT

(75) Inventors: Johan Arthursson, Uppsala (SE); Helen Bäckgren, Västerås (SE); Patrik Berglund, Knivsta (SE); Francis Markey, Uppsala (SE); Annika Remaeus, Uppsala (SE); Karl Andersson, Uppsala (SE); Pär Säfsten, Uppsala (SE); Fredrik Edebratt, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 235 days.

(21) Appl. No.: 11/005,489

(22) Filed: Dec. 6, 2004

(65) Prior Publication Data

US 2005/0165574 A1 Jul. 28, 2005

Related U.S. Application Data

(60) Provisional application No. 60/538,926, filed on Jan. 23, 2004.

(51) Int. Cl.
*G05B 19/42* (2006.01)
*G05B 11/01* (2006.01)
(52) U.S. Cl. .......................... 700/86; 700/18
(58) Field of Classification Search .............. 700/86, 700/18, 23, 12, 9, 253, 27, 81, 79
See application file for complete search history.

(56) References Cited

U.S. PATENT DOCUMENTS 4,370,706 A * 1/1983 Doniger et al. ............... 700/79
4,953,075 A 8/1990 Nau et al. ................... 364/140

5,369,566 A 11/1994 Pfost et al. ................... 364/147

(Continued)

FOREIGN PATENT DOCUMENTS

WO WO 2003/102854 A2 12/2003

OTHER PUBLICATIONS

Gordon, R., "End-User Object-Oriented Interface," *OOPS Messenger*, 5(1):6-12, Jan. 1994.

(Continued)

*Primary Examiner*—Thomas K Pham
(74) *Attorney, Agent, or Firm*—Dwayne L. Bentley

(57) ABSTRACT

A method and an apparatus for the development of a control process for an instrument are disclosed. The method comprises a first step of selecting one or more commands from a plurality of pre-defined commands in which at least one of the selected one or more commands being a purpose-linked command; and a second step of combining the selected one or more commands to produce the control process. The pre-defined commands have a control part for controlling the operation of the instrument and at least one of the pre-defined commands has a purpose part for controlling the purpose of the command. The apparatus for the development of a control process for an instrument comprises a first memory for storing a plurality of control parameters for individual ones of a plurality of commands, a display device for displaying information relating to the plurality of commands, a selection device for selecting ones of the plurality of commands and a processor for combining selected ones of the plurality of commands for producing the control process.

25 Claims, 8 Drawing Sheets

U.S. PATENT DOCUMENTS

| | | | | |
|---|---|---|---|---|
| 6,594,588 | B1 | 7/2003 | Peden et al. | 702/32 |
| 6,618,852 | B1 * | 9/2003 | van Eikeren et al. | 717/108 |
| 6,678,066 | B1 * | 1/2004 | Nakamura | 358/1.13 |
| 6,816,754 | B2 * | 11/2004 | Mukai et al. | 700/245 |
| 7,085,773 | B2 * | 8/2006 | Dorsett, Jr. | 707/104.1 |

OTHER PUBLICATIONS

Maclay, W., et al., "A Graphical Programming Environment for Data Acquisition and Process Control," in *Proceedings of the Industrial Computing Conference*, Anaheim, CA, Oct. 27-31, 1991, pp. 387-400.

* cited by examiner

METHOD AND APPARATUS FOR THE DEVELOPMENT OF A CONTROL PROCESS FOR AN INSTRUMENT

BACKGROUND OF THE INVENTION

1. Field of the Invention

The invention relates to a method and apparatus for development of a control process for an instrument.

2. Description of the Related Art

Instruments for the analysis of biological samples are common in today's laboratory environment. One example of such a system is produced by the Biacore Company in Uppsala, Sweden, (website: http://www.biacore.com) for the analysis of small molecule binding techniques in real time. This is carried out using a surface plasmon resonance (SPR)—based biosensor technology. These systems are used in the drug discovery industry, life science research as well as in food analysis. Such instruments are supplied with software to control their functions and to analyze the results generated.

European Patent Application No. EP-A-1 061 372 (Hitachi) illustrates another example of an apparatus for the analysis of biological samples. The apparatus described in this patent application comprises an analysis module with a plurality of measurement channels including reaction containers. A data processing means is provided which produces calibration information and quality control information for the measurement channels. The apparatus does not, however, disclose any means by which the method of analysis of the biological samples can be altered by the user of the instrument.

Another apparatus for the analysis of a biological sample is a mass spectrometer such as that disclosed in PCT Application No. WO 02/086794 (Sequenom). The apparatus of this patent application includes a system for acquisition and analysis of the data. The apparatus provides a method by which the apparatus can be adjusted after collection and comparison of the data with certain pre-defined data criteria. The apparatus does not, however, provide any means by which the method of analysis of the biological sample can be altered or programmed by a developer for the user of the instrument.

U.S. Pat. No. 6,594,588 (assigned to Thermo Bio Analysis Corp) teaches a system and method for handling laboratory information with a graphical user interface (GUI) with a plurality of windows. The GUI and a user input allow a sequence of tasks to be defined which a processor executes in turn.

The system in the Thermo Bio Analysis Corp patent relies on the concept of a workflow which defines the events to be carried out on a sample. The user can build up a macroscopic workflow using graphical tools which correspond to workflow nodes.

Certain ones of the workflow nodes can support so-called "events". These events may be pre-defined events or user-defined events and are stored in a table associated with each node. When the workflow is processed, the system reads the relevant table and creates an object of the type specified in the table. It appears from the description that these objects could be instructions to perform certain tasks (an example given in the description is splitting of the aliquots).

The user of the system described in the Thermo Bio Analysis Corp. patent builds up a workflow to manage a laboratory instrument from a variety of different commands (objects). Some of these commands control the operation of the instrument, but the purpose of the commands must be programmed in by the user.

U.S. Pat. No 5,369,566 (assigned to Beckmann Instruments) also relates to a programmable controller for a laboratory workstation. The user builds up a so-called "Method" to perform an assay. The Method is made of "Procedures" which in turn are built up as "Functions". A Function is built up from a template. The Functions, having been created, may be stored for later use in the same Procedure or a different one. The Function is created by the operating system by the user answering a series of questions.

International Patent Application No WO-A-03/102854 (assigned to Applera) teaches a system and method for control and monitoring of a number of biological instruments. The invention implements a control and communications system for a laboratory having at least one sample analyzer and a data processor (page 2, lines 30-31). The sample analyzer receives commands selected from at least one pre-set list of commands from the control system and translates the commands into a format to run the sample analyzer (page 3, lines 2-3).

BRIEF SUMMARY OF THE INVENTION

An object of the invention is to provide a developer with a means for developing software to control the operation of the instrument.

A further object of the invention is to provide a consistency check after development of the software to control the instrument.

Yet a further object of the invention is to simplify the analysis of the output of the instrument.

These and other objects of the invention are solved by providing a method with a first step of selecting one or more pre-defined commands and a second step of using the selected one or more commands to produce the control process.

The pre-defined commands have a control part for controlling the operation of the instrument and at least one of the pre-defined commands have a purpose part which indicates a designated purpose. Such individual operations (commands) include but are not limited to a start-up process, a conditioning process, a sample handling process, a termination process, etc. Commands with a designated purpose (purpose part) are denoted purpose-linked commands. Different purpose-linked commands may have identical instrument control parts and differ only in the purpose of the command. One such example is the injection of liquid into an instrument. The very same instrument control part (i.e., inject liquid) could be part of the different commands "capture-inject" and "sample-inject". The purpose of a "capture-inject" command could be to prepare the instrument for analysis (e.g., to let the instrument capture one of two binding partners) while the purpose of the "sample-inject" command could be to find out if an unknown sample interacts with a binding partner already captured in the instrument. The individual operation could be also a pause or wait process in which the operation of the instrument is temporarily halted. In this method, a developer is given the opportunity to select one or more of the commands from a menu of possible commands and thus create the control process for the instrument. This provides a greater degree of flexibility of control over the instrument.

The purpose part can be used to ensure the consistency of the selected pre-defined commands. The consistency check ensures that the method developed by the developer is consistent and reliable. The purpose part can also be used to evaluate the output of the experiment. In particular, the output may need to be evaluated in different manners, depending on the purpose of the pre-defined command.

It should be noted that not all commands may have a purpose part. Some commands do not need to (or cannot) be checked for consistency. In the preferred embodiment of the invention, a majority of the commands are purpose-linked (i.e., have a purpose part). More preferably at least about 75% (and especially about 90%) of the commands are purpose-linked.

In one embodiment of the invention, at least one of the selected pre-defined commands is grouped together in one or more cycles. The use of the term "cycle" is not meant to necessarily imply a repeating sequence of commands. The cycle of commands could be run once, or the cycle of commands could be run several times. This provides a great degree of flexibility in the programming of the control process. It is furthermore possible for the developer to select a plurality of the selected one or more commands to produce a repeating cycle of commands. This is particularly useful to allow repeated measurements of samples to take place and to allow regular measurements to be made on controls.

In another embodiment of the invention, the developer can select one or more cycles and combine the cycles to produce a block. The block is a sequence of commands which has a particular purpose.

The method also provides a step of checking consistency of the selection of the commands. As described above, this ensures that the developer does not combine incompatible commands together. The checking of the consistency is carried out by using consistency command rules associated with each ones of the commands. The consistency of the commands in the block can also be checked by using consistency block rules.

The method may also include a step of selecting one or more external commands to drive devices external to the instrument. These external commands can be passed through an interface and allow other instruments, apparatuses or devices to be connected into the control process.

The objects of the invention are also solved by providing an apparatus for the development of a control process for an instrument. The apparatus has a first memory for storing a plurality of control parameters for individual ones of a plurality of pre-defined commands and a display device for displaying information relating to the plurality of pre-defined commands. The apparatus has moreover a selection device for selecting ones of the plurality of pre-defined commands and uses a processor for processing selected ones of the plurality of pre-defined commands. The selected pre-defined commands form together the control process.

As explained above, using this apparatus a control process for the instrument can be easily created by the developer for use by a user of the instrument.

Finally the object of the invention is also solved by providing an instrument for carrying out an analysis which is controlled by a control process developed using the inventive method.

DETAILED DESCRIPTION OF THE INVENTION

Figure 1:
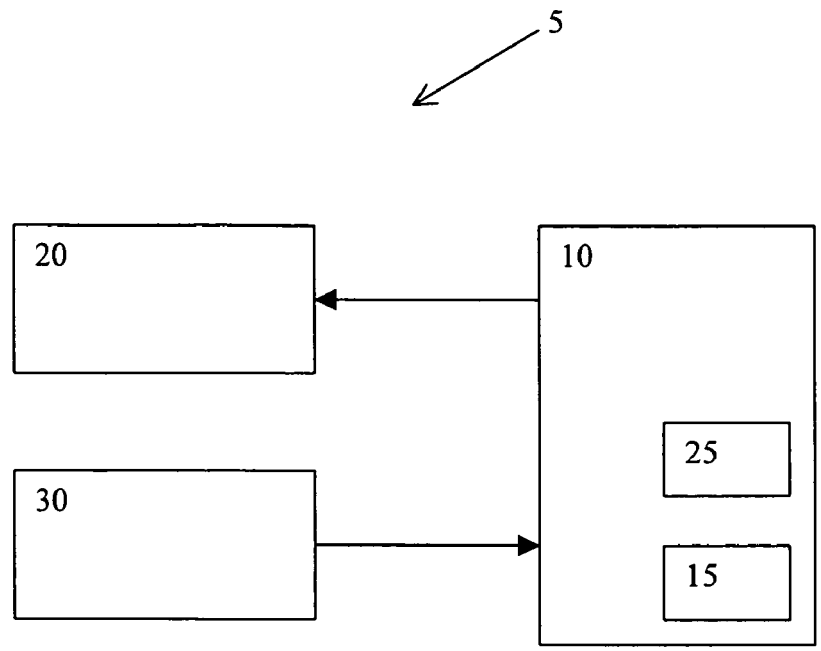
FIG. 1 shows an outline of the experimental system

FIG. 1 shows an outline of an instrument 5 for the performance of an experiment. The instrument 5 comprises an experimental station 10 in which the experiments are performed. The type of experiments include but are not limited to an assay, analysis or quality control (such as in food processing).

The instrument 5 has a processor 15 for controlling the experiment and collecting the data. A data entry device 30, such as a keyboard, a mouse, a graphic pad, or similar, is connected to the instrument 5 and allows a user of the instrument 5 to enter or select commands or data and thus control the experiments performed by the instrument 5. A data display device 20, such as a visual display unit or a printer, is also connected to the instrument 5. The data display device 20 displays data generated by the experimental station 10. The data display device 20 can also be used in conjunction with the data entry device 30 and the processor 15 to develop a control process for the experimental station 10.

The experimental station 10 could be one or more of a large number of devices for performing experiments on samples. For example, the experimental station 10 could be, but is not limited to, a mass spectrometer, a microarray, an apparatus for performing surface plasmon resonance experiments, or combinations thereof. The control process must be developed for controlling the overall operation of the instrument 5 and thus the experiment that is to be performed by the experimental station 10. In the prior art, the control process is normally pre-programmed into the experimental station 10 and the user has only a limited range of options. As discussed above, some prior art is known in which the developer has an opportunity to develop or change the control process. However, this prior art does not disclose consistency checking. The instrument 5 of the invention is able to provide the user with a greater range of options for performing the experiment with appropriate checks.

The experimental station 10 is provided with a memory 25 which stores a set of pre-programmed commands. The set of pre-programmed commands is specific for each one of the experimental stations 10. One or more commands from the set of pre-programmed commands are grouped together to form a cycle of commands. The cycles of commands in turn are grouped together as blocks. The blocks control certain aspects of the operation of the experimental station 10. For example, one block may be a process which starts up or initializes the experimental station 10. Another block may be one which carries out experiments on the samples within the experimental station 10. Similarly blocks may be developed which run experiments on controls within the experimental station 10.

It should be noted that the blocks may require input of variables or parameters, such as names, types of process, temperature or other conditions. These variables are obtained in real time when the user runs the control process and carries out an experiment in the experimental station 10, as will be explained below.

There may be at least two types of blocks. Some blocks are top-level sub-processes which occur just once or can be repeated. Examples of such blocks which occur just once include the afore-mentioned start-up process. Other blocks may be recurring sub-processes which are implemented at regular intervals within another process and are nested within another block.

Figure 2:
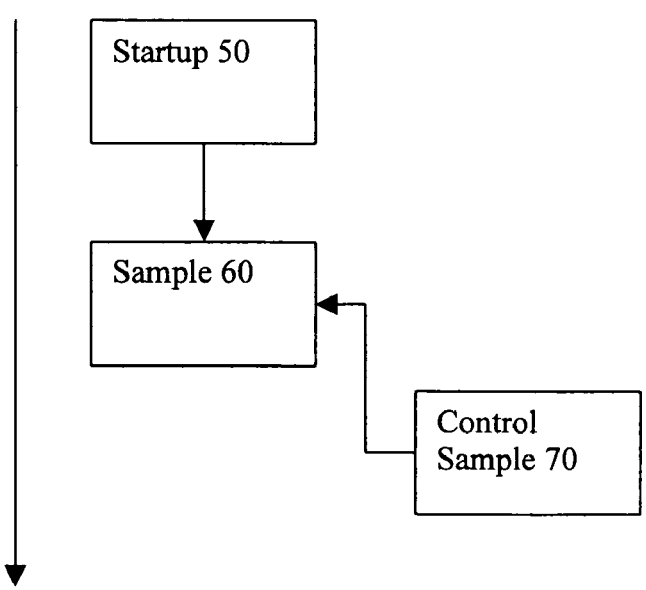
FIG. 2 shows a schematic diagram of a control process

FIG. 2 shows an example of these blocks. The control process for carrying out an experiment comprises a start up block 50 having commands which are carried out once at the beginning of the experiment in the experimental station 10 to initialize the experiment. After the commands associated with the start up block 50 have been carried out, the commands in a sample block 60 are carried out. The commands in the sample block 60—which could relate to experiments performed on one or more samples—are repeated a number of times. Within the sample block 60, a control block 70 is present. The control block 70 has commands which perform an experiment on a control. In one embodiment of the invention, the commands in the control block 70 are run after every twenty sample blocks 60.

Figure 3:
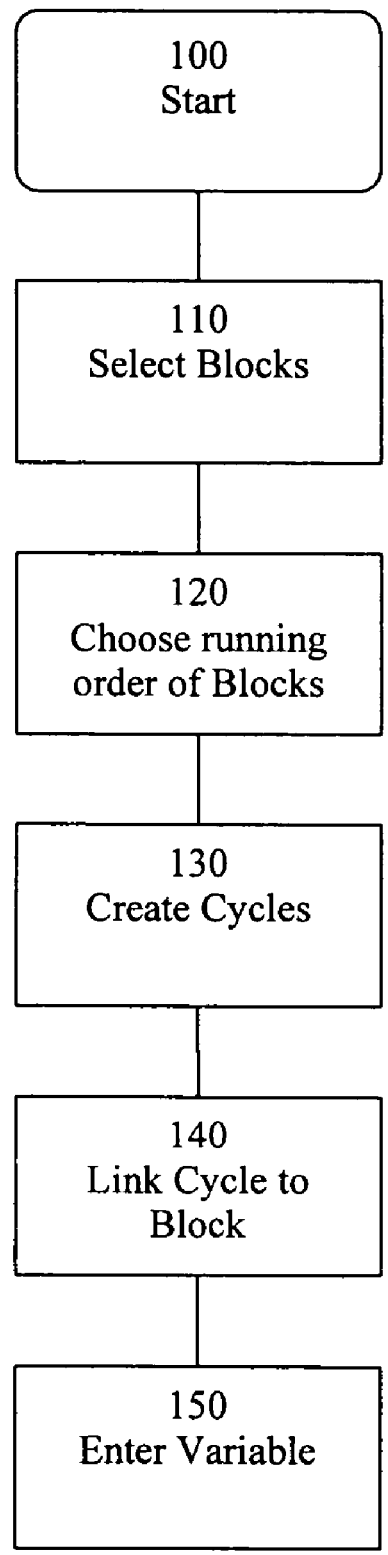
FIG. 3 shows a flow diagram for the creation of the control process

FIG. 3 shows the development of the control process by a developer. It should be noted that the processor 15 or another computer provides a program for creating the control process. Only developers with sufficient access rights are authorized to create the control process. Normal users can only run the final control process i.e., the finally developed control process. Normal users are empowered to add data to the final control process if this is required to run the experiment.

The developer is creating the control process to run an experiment, such as an assay, and starts at point 100. At step 110, the developer selects those blocks which will be required for the final control process. Each block has a purpose. The developer can use a graphical user interface, to develop the processes. The graphical user interface is shown on display device 20 and the developer uses the input device 30 to input information or instructions. Examples of the graphical user interface in the form of screen shots are shown in FIGS. 4 and 5.

Figure 4:
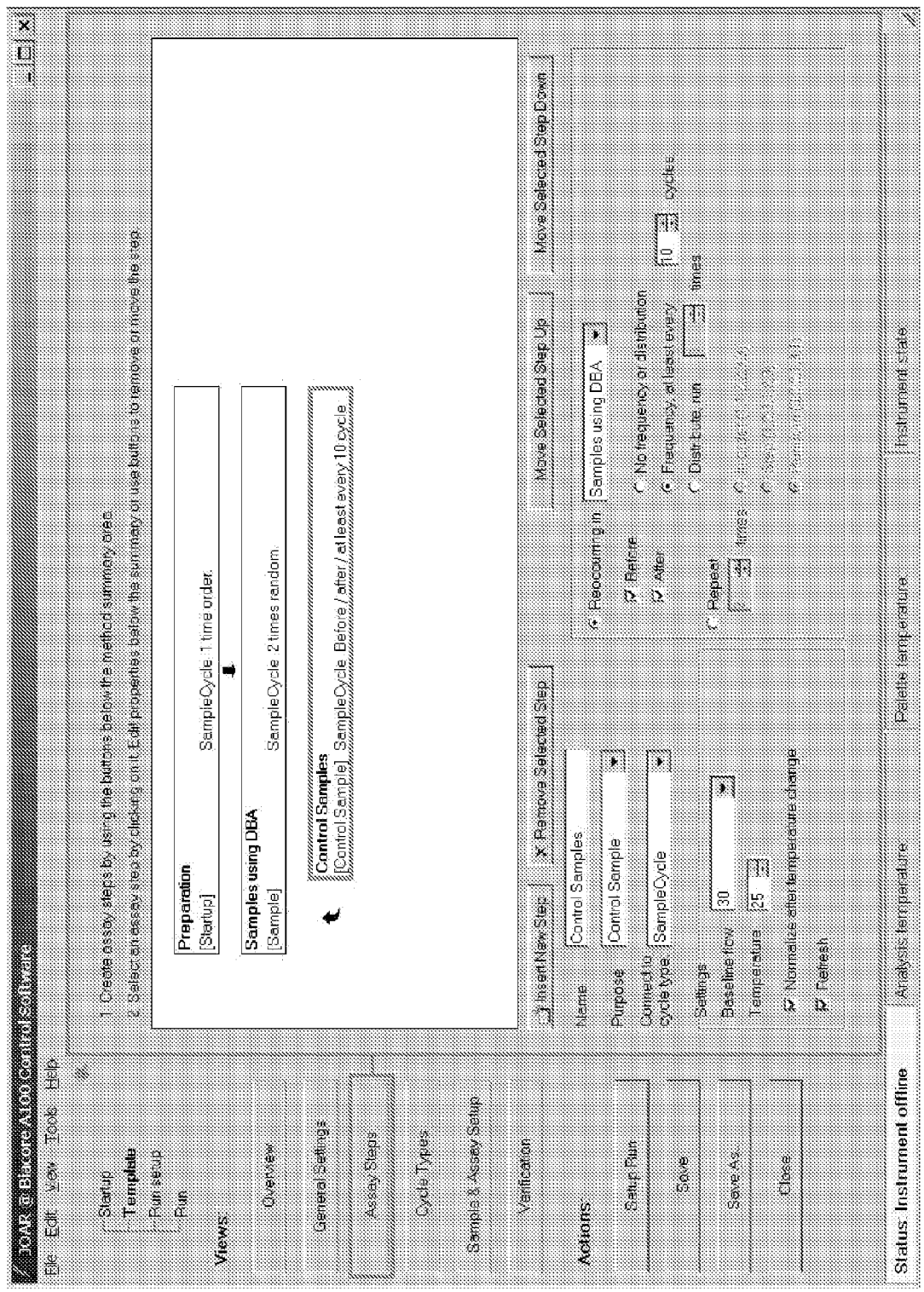
FIG. 4 shows a screen shot used in the creation of blocks
Figure 5:
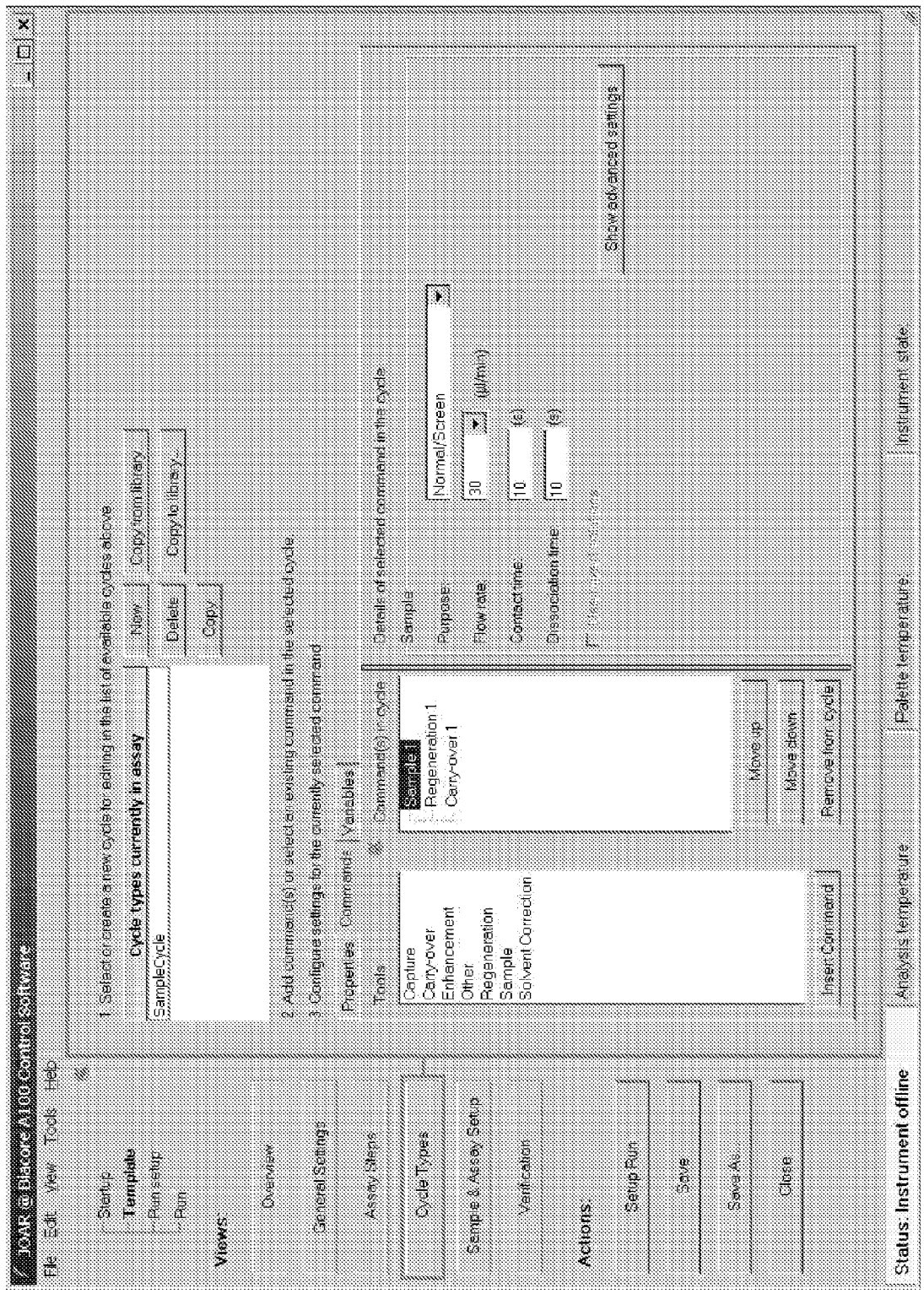
FIG. 5 shows a screen shot used in the creation of cycles

One example of a screen shot displayed on the display device 20 for the selection of the blocks is shown on FIG. 4. This shows a number of blocks (Preparation; Samples using DBA; Control Samples) that have been created by the developer. In this example, the blocks are termed "assay steps". The assay step Control Samples is a recurring assay step (or block) that is part of the Samples using DBA assay step. As shown on the top section of the screen shot, this assay step is run within the Samples using DBA assay step at least after every 10 of the Sample using DBA assay steps.

On the bottom half of the screen shot the details of the selected assay step (in this example the Control Samples assay step) are given. It will be seen that the temperature of the experimental station 10 should be set to 25° C. when running this assay step. In the bottom half on the screen shot, the purpose of the assay step is given.

Each assay step has one or more cycles associated with the assay step. The Preparation assay step has one cycle, Sample Cycle, associated with it. The Samples using DBA assay step has the Sample cycle associated with it. The Control Samples assay step also has the Sample cycle associated with it. The method of programming the cycles will be outlined below. It should be noted at this stage that the operations performed by the Sample cycles are all identical with each other, even though they occur in different assay steps.

As a further example of identical cycles, consider a cycle to inject liquid into the experimental station 10. Different liquids can be injected at different times during the control process. At one point a wash solution is injected. At another point a sample solution is injected. Such identical cycles will have the same control parts of the commands and perform the same operations in controlling the instrument 10. Only the liquids injected into the experimental station 10 will be different and thus the purpose is different and hence the purpose part will be different.

In the next step 120 of FIG. 3, the running order of the blocks (assay steps) is decided. It will be seen in FIG. 4 that the assay steps can be repeated a specified number of times (in this case not repeated) and the order of repeat of the assay steps also indicated (i.e., in order; step; random). Thus the developer selects the appropriate value by selecting the appropriate box and/or inputting the required value. The developer can also indicate which assay steps are top-level assay steps and which assay steps are recurring assay steps as discussed in connection with the blocks of FIG. 2.

After the blocks (assay steps) have been created, the cycles need to be created (step 130). The cycles are the implementation of the blocks and are created from the set of commands. The predefined commands are shown on the graphical user interface of FIG. 5 (Capture; Carry-Over; Enhancement; Other; Regeneration; Sample; Solvent Correction). The developer can select those pre-defined commands which are necessary for the cycle in the example shown for the Sample Cycle.

In the example shown on the screen shot of FIG. 5, three pre-defined commands have been chosen for the Sample cycle. These are Sample, Regeneration and Carry-over. On the bottom right of the screen shot, the developer can see details of the parameters used by the selected pre-defined command and can alter the values as and when required.

The pre-defined commands contain all of the software or instructions necessary to operate the experimental station 10 in conjunction with the processor 15. These pre-defined commands are pre-programmed and cannot be altered by the developer of the control process.

Figure 6:
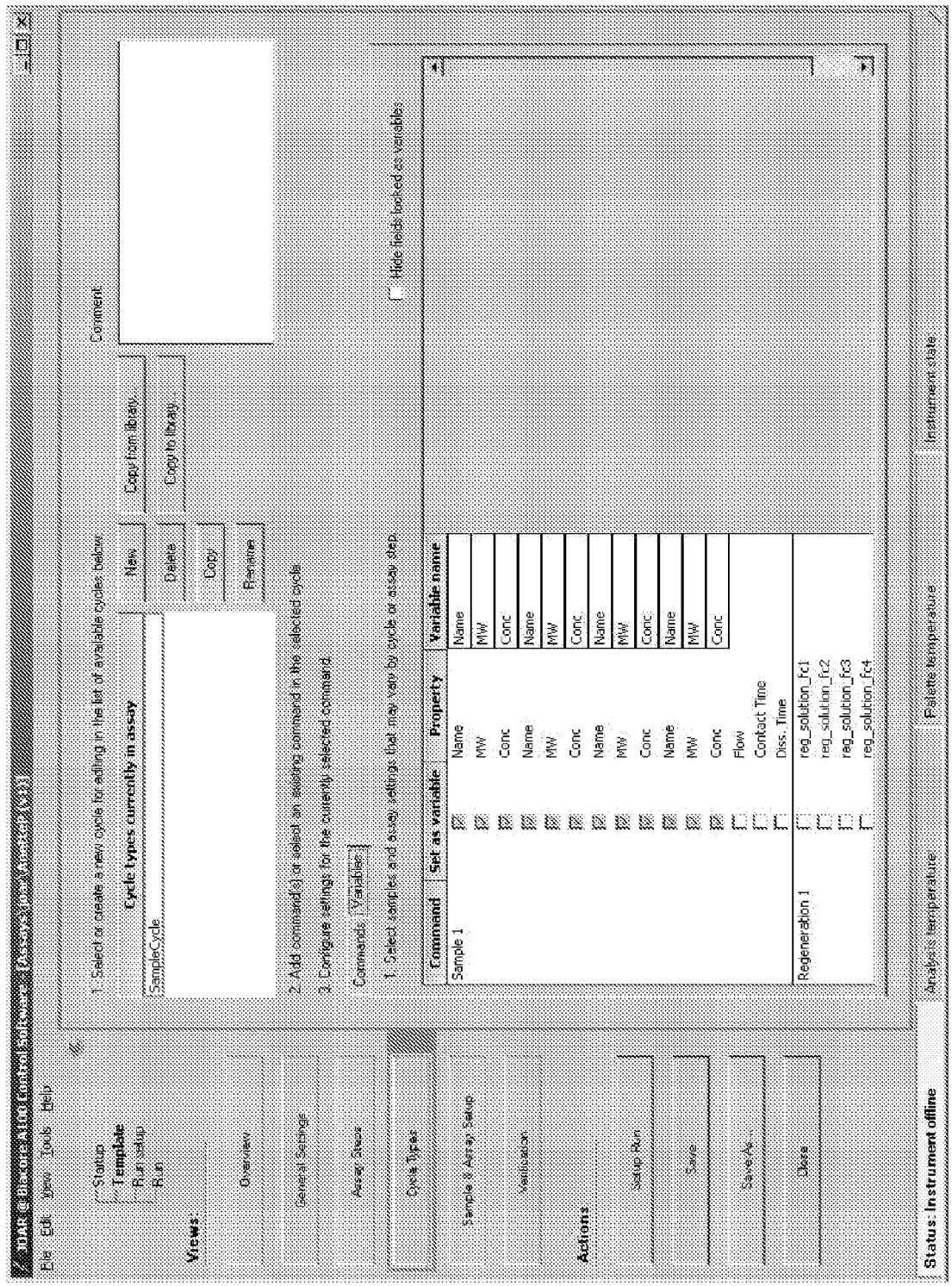
FIG. 6 shows a screen shot used for defining variables, solutions and samples

In FIG. 6, a screen shot of another view of the cycle creation process is shown. In this case, the developer inputs the variables required in the cycle.

Figure 7:
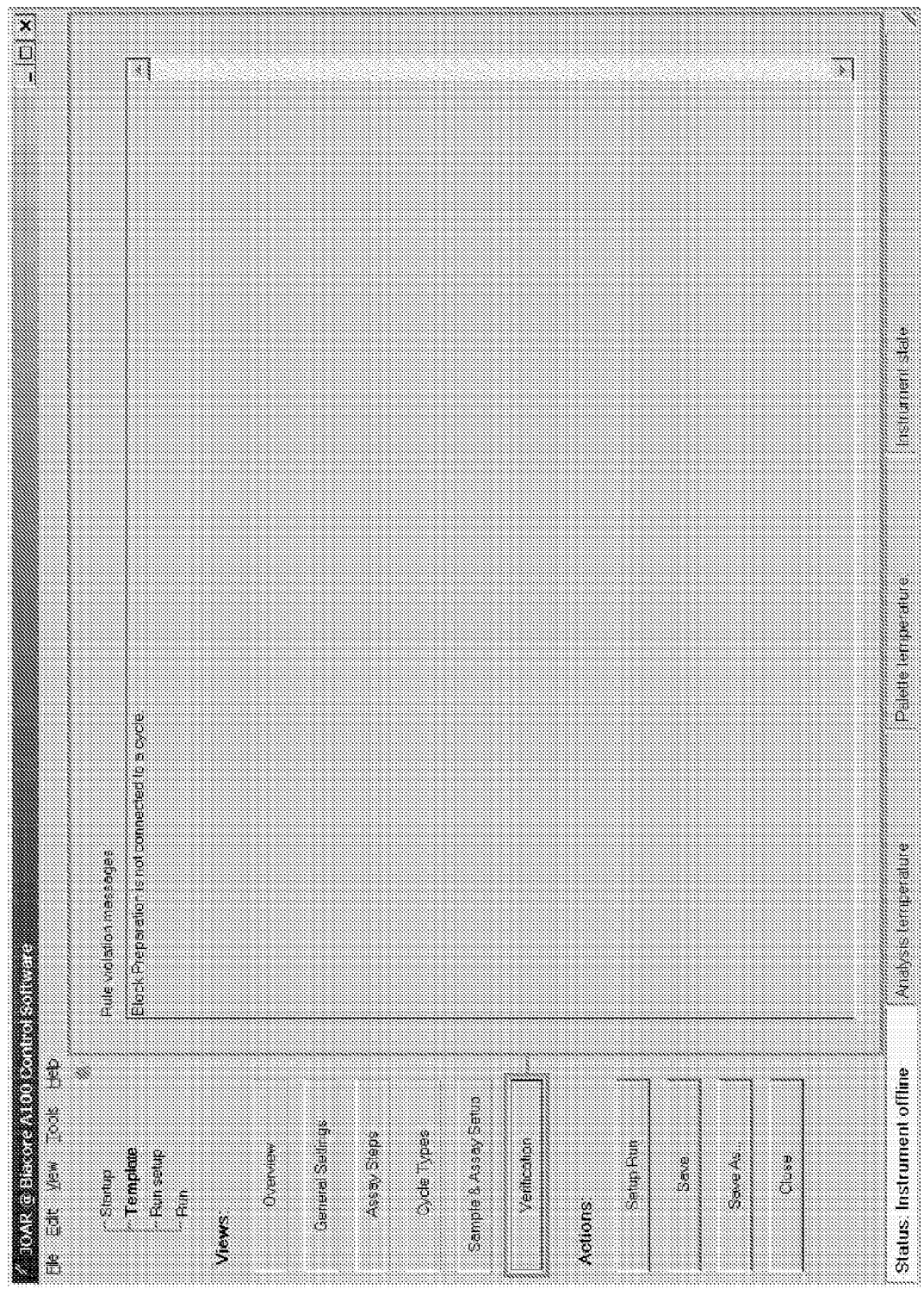
FIG. 7 shows a rule consistency checking process.

In step 140 of FIG. 3, the cycles are linked to the blocks. As explained above one cycle can be connected to more than one block. Each type of block has consistency rules associated with it. These consistency rules ensure that the cycles are correctly implemented on each instrument 5 and that the cycles are consistent with each other. For example, a block might not be connected to a cycle in one example of the invention shown in FIG. 7. In this case, an error message will be issued and the developer can correct the control process.

Additionally, each of the predefined commands has consistency rules associated with them. These ensure that the sequence of pre-defined commands is executed correctly and is internally consistent.

In the final step 150, the user needs to enter the variables required by the cycle and which were defined by the developer (see FIG. 6), i.e., for the samples that should be run in the assay steps of the experiment. The user will also see a run list with all of the cycles generated to run the control process prior to giving the instruction to run the control process.

Figure 8:
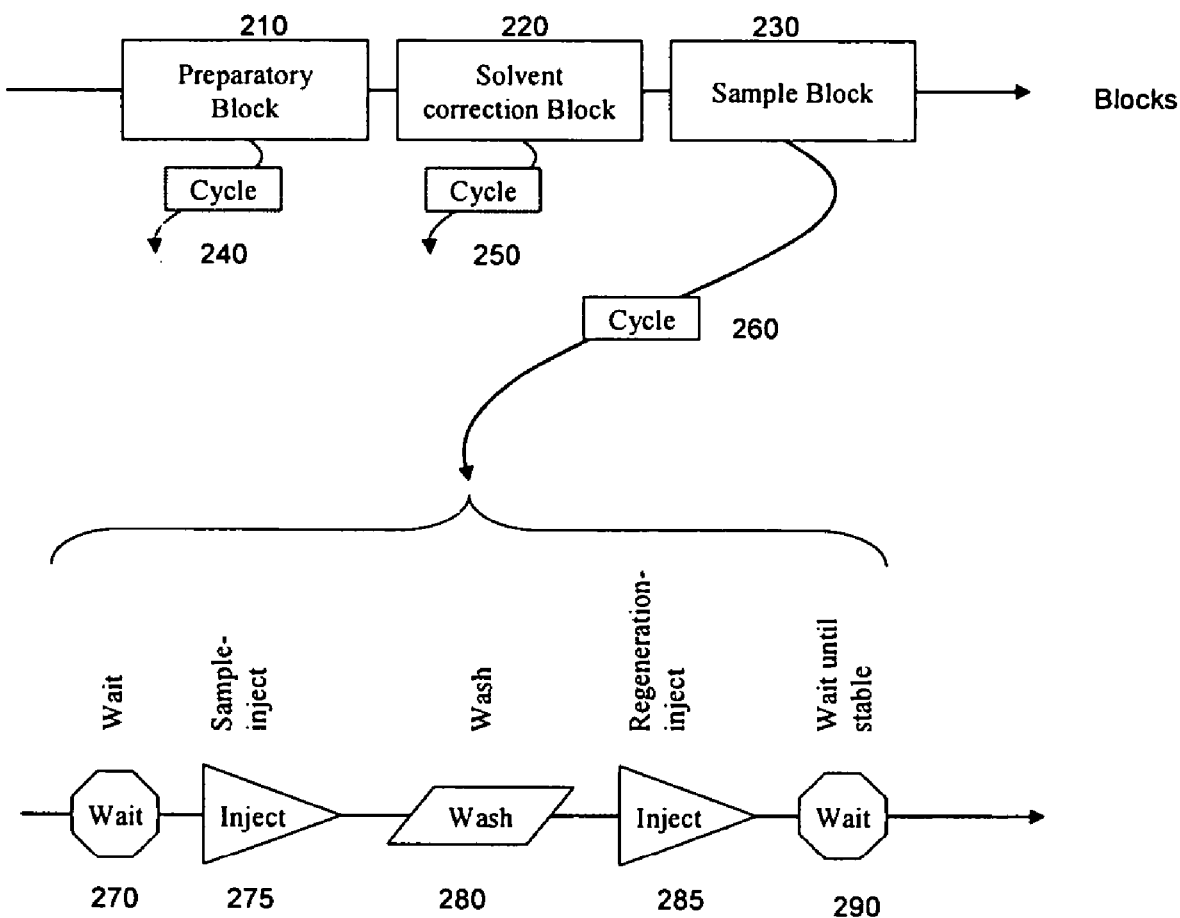
FIG. 8 shows an example of the invention

A first example with reference to FIG. 8 will help to demonstrate the invention more clearly. The control process comprises at least three blocks: the Preparatory block 210; the Solvent Correction block 220 and the Sample block 230. The Preparatory block 210 and the Solvent Correction block 220 each have cycles 240 and 250 linked to them which are not detailed.

The Sample block 230 has at least one cycle 260 linked to it. The cycle 260 has at least five commands linked to it: wait 270; inject 275; wash 280; inject 285; wait 290. The wait 270 and the wait 290 commands are identical. The inject 275 command and the inject 285 commands are identical in the sense that they carry out the same function. However, they can have different purposes.

It is also possible to add external modules to the experimental station 10. The external module is provided with an API (Application Programming Interface) which can be addressed by at least one command. The commands provide information, such as required parameters, to the external module.

On completion of the creation of the control process, the software used in developing this system is, in one instance, implemented in Microsoft .NET code and is also stored in the memory 25 of the instrument 5. The user of the instrument then has to call up the control process and run the experiment after inputting any required parameters.

Post processing of the results can be carried out in the processor 15 or downloaded to another apparatus. The methods for the post processing of the results may have access not only to the data measured by the experimental station 10, but also the definition of the experiment in terms of blocks, cycles and commands. Since at least some of the pre-defined commands are linked to a purpose, the method for post processing can provide guidance adapted to the data (e.g., automatically adjust axis settings of a plot so that only data near the sample-injection 275 is displayed).

Figure 9:
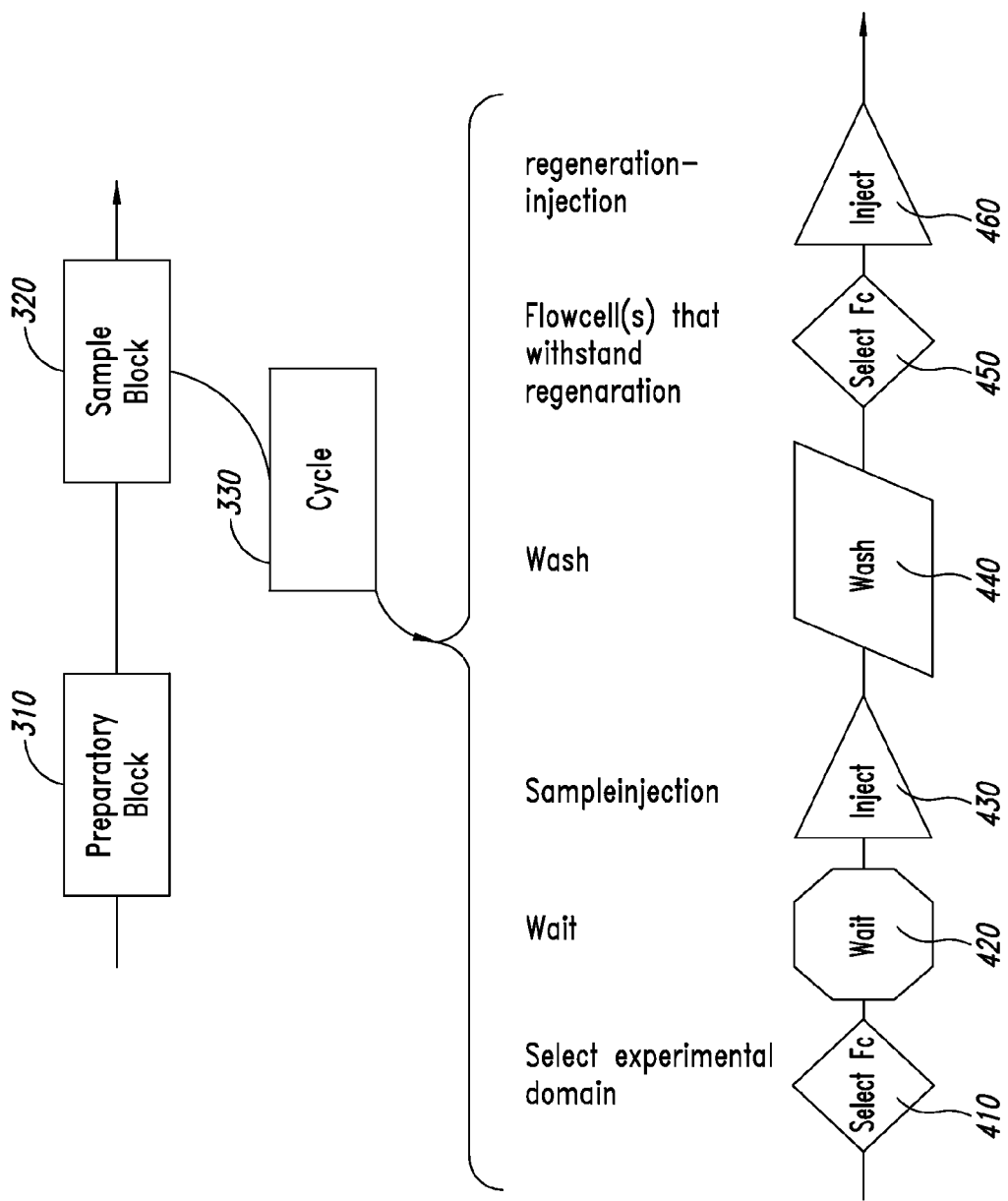
FIG. 9 shows a further example of the invention

Another example of the invention is illustrated in FIG. 9. The instrument 5 used four flow cells (denoted 1, 2, 3, and 4) which can be addressed in the following combinations: 1, 2, 3, 4, 1+2, 3+4, 1+2+3+4. One example of the instrument 5 is a Biacore 3000 system (the Biacore 3000 system is described in a product information brochure at http://www. biacore. com/ pdf/products/bc3000/Biacore_3000_PIS.pdf—accessed on 10 Nov. 2004). Suppose that a measurement is performed which involves 50 sample molecules interacting with one fragile molecule and one robust molecule is performed. The measurement is designed according to the following protocol:

In a first step, the fragile molecules are immobilized in a flow cell 1 and a flow cell 3. The robust molecules are immobilized in a flow cell 2 and a flow cell 4.

A preparatory block 310 is run as described previously.

A sample block 320 is then run. The sample block 320 comprises 50 repeats of the following cycle 330:

In step 410 the flow cells for analysis are selected. In this step, the subset of the flow cells selected for analysis is defined. In one example, the first 25 repeats of the cycle would use the flow cell 1 and the flow cell 2 and in the last 25 repeats would use the flow cell 3 and the flow cell 4. This would increase the probability of having non-destroyed fragile molecules as ligands throughout the measurement.

In step 420 a wait step is performed to obtain a stable system.

In step 430 one sample molecule is injected over the selected subset of flow cells (i.e., flow cell 1 and flow cell 2 or flow cell 3 and flow cell 4).

In step 440 the system is washed.

In step 450 one of the flow cells is selected for which a regeneration step is performed. Since there is one fragile molecule and one robust molecule only the robust molecule is expected to withstand the regeneration step. Thus, during the first 25 repeats, the flow cell 2 is selected. During the last 25 repeats, the flow cell 4 is selected. This would also increase the probability of having a non-destroyed fragile molecule as a ligand throughout the experiment.

In step 460 a regeneration solution is injected over the currently selected one of the flow cells.

When evaluating the output from the experiment, the purpose-linked commands will make it possible to guide the user. Although the operations performed in steps 410 and 450 are essentially the same, the purpose of step 410 is to define the current experimental domain and the purpose of step 450 is to protect the fragile molecule. Thus, after step 450, the output from the two selected ones of the flow cells should be handled separately.

Furthermore, the operations performed in steps 430 and 460 are essentially the same. The purpose of the step 430 is to inject a sample molecule, which means that the information about the sample molecules will be found in the vicinity of step 430. The regeneration step 460 aims at restoring baseline conditions in the instrument 5, and should be evaluated in a completely different way.

By attaching the purpose to the pre-defined command, the instrument control software checks the consistency of the sequence of commands. If, for example, the step 450 of flow cell selection would be executed prior to the sample injection sep 430, the instrument control software could inform the user that the sample injection step 430 will not reach all of the flow cells in the experimental domain. After the experiment has been performed, the evaluation of the obtained data can be significantly simplified. The evaluation software could automatically collect all of the data relating to the sample injections and display them for the user, thereby minimizing the risk of user-induced errors.

Without knowledge of the purpose of the different pre-defined commands, such consistency checks and evaluation supports require substantially more resources and human intervention. These consistency checks using the purpose part are in addition to the consistency checks using the consistency rules described earlier.

The foregoing is considered illustrative of the principles of the invention and since numerous modifications will occur to those skilled in the art, it is not intended to limit the invention to the exact construction and operation described. All suitable modifications and equivalents fall within the scope of the claims.

The invention claimed is:

1. Method for the development of a control process for an instrument comprising:
    a step of selecting a plurality of commands from a plurality of pre-defined commands, at least one of the plurality of pre-defined commands having both a control part and a purpose part, whereby the control part determines an action to be performed in the operation of the instrument and the purpose part determines the purpose of the action, and wherein at least one of the selected plurality of commands has the purpose part;
    a step of checking consistency of the selected plurality of pre-defined commands, wherein the step of checking the consistency of the combination of the selected plurality of commands comprises checking consistency instruction rules associated with each ones of the selected plurality of pre-defined commands; and
    a step of using the selected plurality of commands to produce the control process.

2. Method according to claim 1, wherein at least one of the selected plurality of pre-defined commands are grouped together in one or more cycles.

3. Method according to claim 2, further comprises a selection of one or more cycles to produce a block.

4. Method according to claim 2, comprises a combination of at least some of one or more cycles to produce a set of repeating cycles.

5. Method according to claim 3, further comprising a step of checking consistency of the block.

6. Method according to claim 5, wherein the step of checking the consistency of the block comprises checking consistency block rules associated with the block.

7. Method according to claim 1, further comprising a selection of one or more pre-defined commands to produce an initialization block to initialize the instrument.

8. Method according to claim 1, wherein at least two of the selected plurality of pre-defined commands are substantially identical.

9. Method according to claim 1, wherein the order of the combination of the selected plurality of pre-defined commands is at least partly selected at random.

10. Method according to claim 1, wherein the step of selecting the plurality of pre-defined commands further includes a step of selecting an external command for addressing an external device external to the instrument.

11. Method according to claim 1, further comprising a step of entering one or more variables for use in one or more of the selected plurality of pre-defined commands.

12. Method according to claim 1, wherein the instrument is a laboratory instrument and the control process is a process for performing an experiment at an experimental station.

13. Method according to claim 1, wherein the instrument is a quality control instrument for performing quality control on foodstuffs and the control process is a quality control process.

14. Apparatus for the development of a control process for an instrument comprising:
   a first memory for storing a plurality of control parameters for individual ones of a plurality of pre-defined commands, the at least one of the individual ones of pre-defined commands having both a control part for determining an action to be performed in the operation of the instrument and a purpose part for determining the purpose of the action;
   a display device for displaying information relating to the plurality of pre-defined commands;
   a selection device for selecting ones of the plurality of pre-defined commands; and
   a processor for using selected ones of the plurality of pre-defined commands for producing the control process,
   wherein the processor checks the consistency of the combination of selected ones of the plurality of pre-defined commands,
   wherein the first memory further stores command consistency rules associated with the individual ones of the plurality of pre-defined commands.

15. Apparatus according to claim 14, further comprising a second memory for storing details of blocks, said blocks consisting of a plurality of some of the pre-defined commands for the control process.

16. Apparatus according to claim 15, wherein the second memory further stores block consistency rules associated with the blocks.

17. Apparatus according to claim 15, wherein the processor further checks the consistency of the blocks.

18. Apparatus according to claim 14, further comprising one or more interfaces to external devices.

19. Apparatus according to claim 14, wherein the instrument is a laboratory instrument.

20. Apparatus according to claim 14, wherein the instrument performs quality control measurements on foodstuffs.

21. Apparatus according to claim 14, wherein the instrument further comprises post-processing analysis equipment.

22. Instrument for carrying out an analysis, wherein the instrument is controlled by a control process developed by a method comprising:
   a step of selecting a plurality of commands from a plurality of pre-defined commands, at least one of the plurality of pre-defined commands having both a control part and a purpose part, whereby the control part determines an action to be performed in the operation of the instrument and the purpose part determines the purpose of the action, and wherein at least one of the selected plurality of commands has the purpose part;
   a step of checking consistency of the selected plurality of pre-defined commands, wherein the step of checking the consistency of the combination of the selected plurality of commands comprises checking consistency instruction rules associated with each ones of the selected plurality of pre-defined commands; and
   a step of using the selected plurality of commands to produce the control process.

23. Instrument according to claim 22 further comprising means for entering variables for use in the control process.

24. Instrument according to claim 22, further comprising post-processing analysis equipment.

25. A computer readable medium having computer-executable instructions for performing a method comprising:
   a step of selecting a plurality of commands from a plurality of pre-defined commands, at least one of the plurality of pre-defined commands having both a control part and a purpose part, whereby the control part determines an action to be performed in the operation of the instrument and the purpose part determines the purpose of the action, and wherein at least one of the selected plurality of commands has the purpose part;
   a step of checking consistency of the combination of the selected plurality of pre-defined commands, wherein the step of checking the consistency of the combination of the selected plurality of commands comprises checking consistency instruction rules associated with each ones of the selected plurality of pre-defined commands; and
   a step of using the selected plurality of commands to produce the control process.

* * * * *